July 6, 1965     O. S. McJOHNSON     3,192,625
GARDEN CLIPPER
Filed Dec. 24, 1963     3 Sheets-Sheet 1
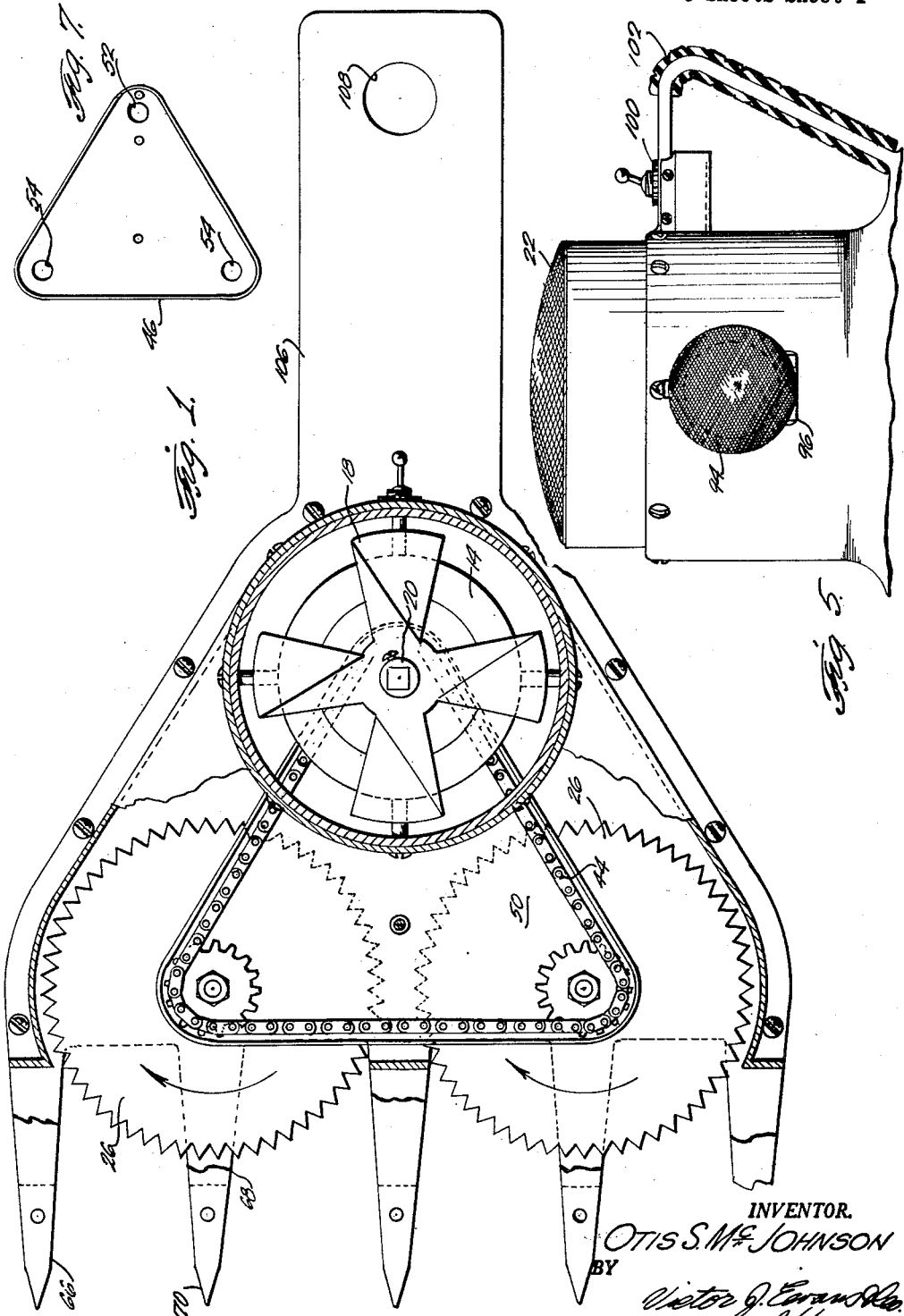
INVENTOR.
OTIS S. McJOHNSON

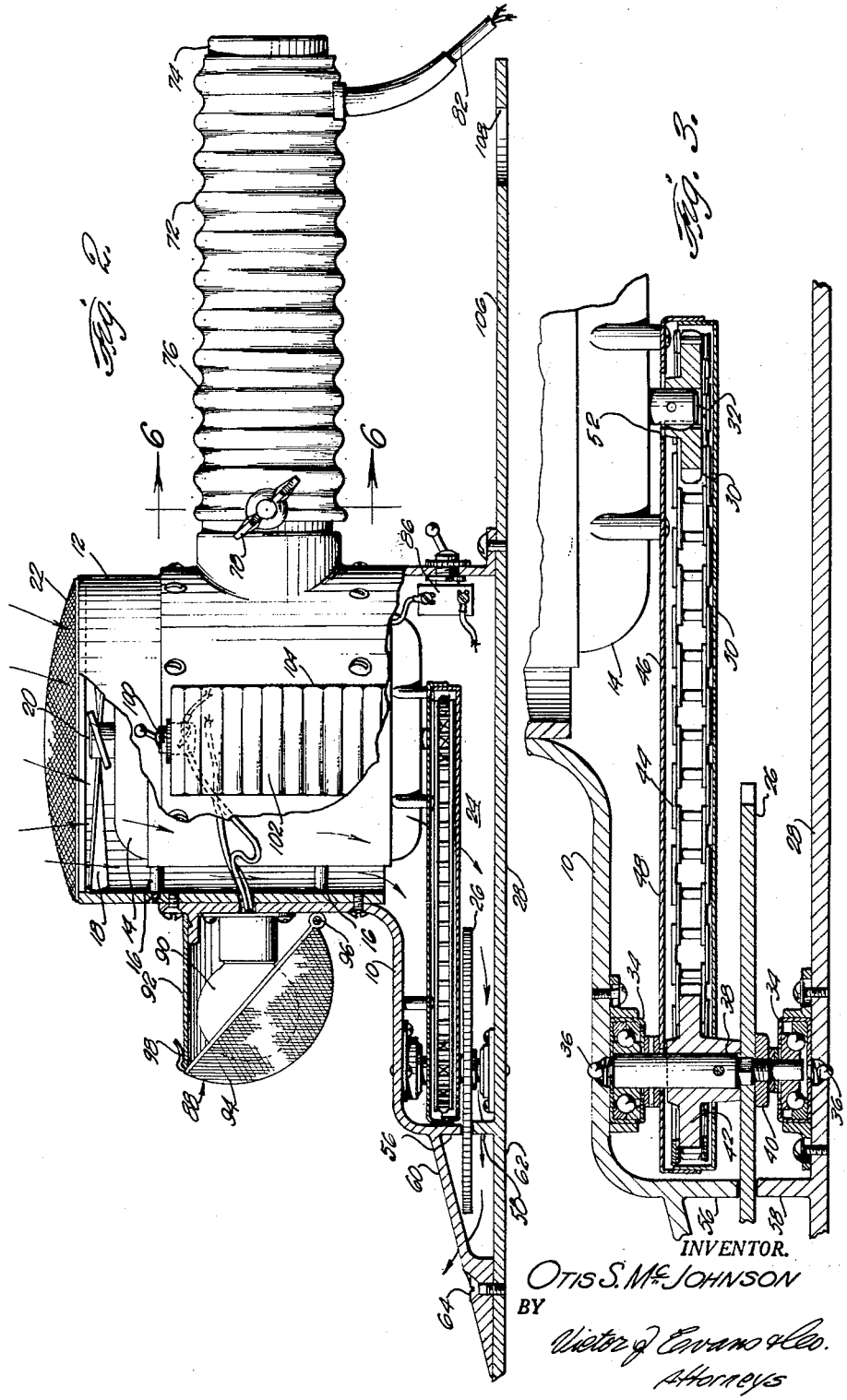

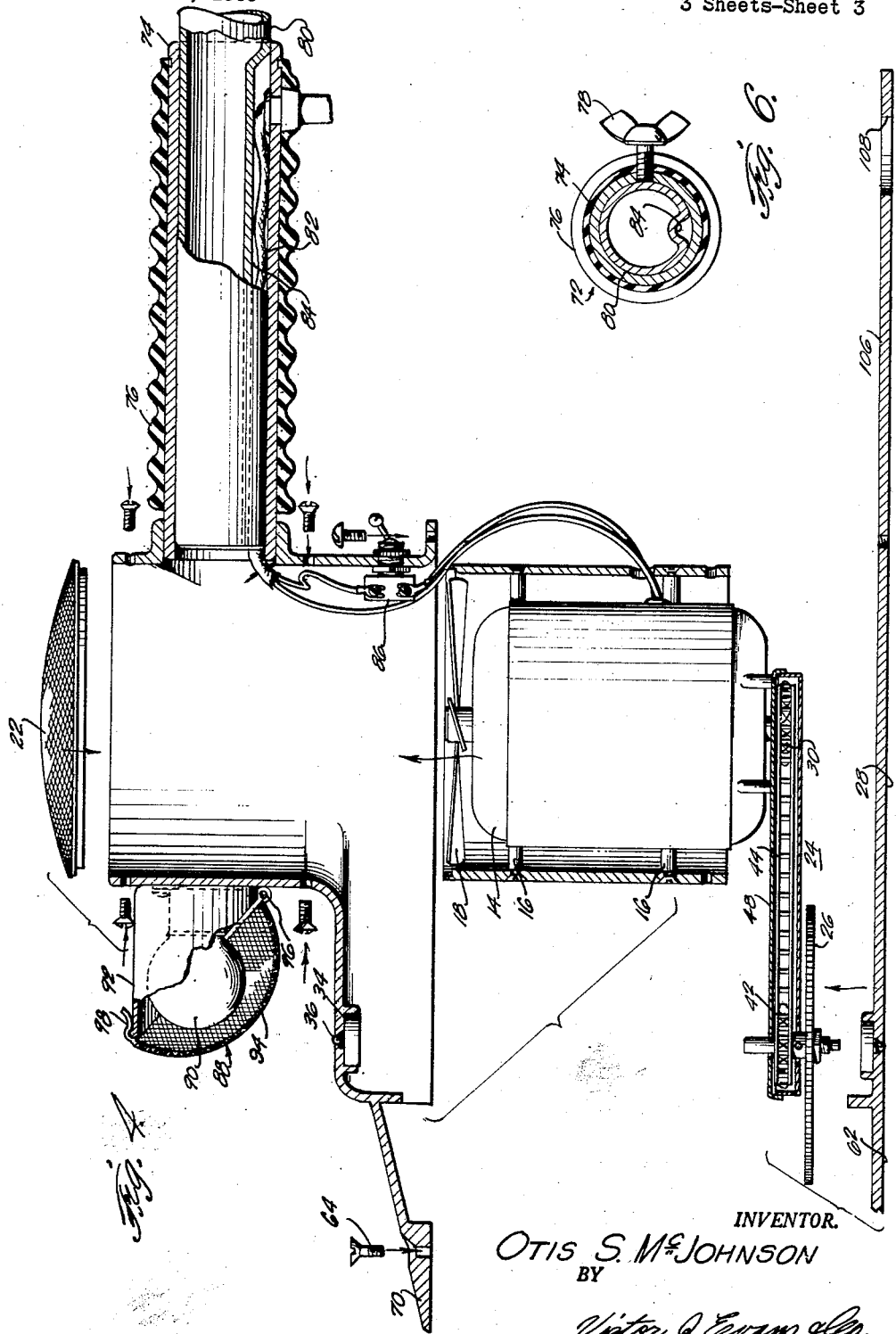

United States Patent Office 3,192,625
Patented July 6, 1965

3,192,625
GARDEN CLIPPER
Otis S. McJohnson, Pasadena, Tex., assignor of 30 percent to Leonard Hill, Pasadena, Tex.
Filed Dec. 24, 1963, Ser. No. 333,016
1 Claim. (Cl. 30—276)

This invention relates generally to portable power tools and more particularly to pruning and trimming devices employed for landscaping and gardening.

Presently known devices for pruning and trimming are divided into two groups, namely, manually operated scissors and power operated oscillating blade cutter. The scissors type devices are constructed and manufactured with corresponding blade weights, each being limited in use. For instance, one scissors can be used only for trimming grass while another is restricted for use in trimming hedges and bushes. Oscillating blade cutters are also limited in use to trimming hedges and bushes and for rough cutting of grass. Both of the aforementioned types of cutters are precluded from trimming trees and large branches encountered when pruning over-grown bushes. Therefore, the gardener requires still another type of pruning device in his operation for eliminating foliage which is too large for the scissors or oscillating blade cutters. Pruning cutters can be employed for smaller size branches, however, a tree saw is necessary for larger branches and small trees. It is, therefore, necessary for the gardener employing the presently known devices to carry with him a large collection of trimming and cutting tools for performing his operation efficiently.

It is apparent, therefore, that a great need exists for a tool which can perform all of the aforementioned functions previously inherent only in separate devices. Such a tool could be carried quite easily from place to place without the need of employing a cart or a wheelbarrow to handle many varieties of tools necessary for gardening and landscaping. Such a unitary tool would also eliminate the need of the gardener to lay down one tool which cannot accomplish an immediate job and to pick up another. That is, if the gardener is required to change from one tool to another during the performance of his duties, a considerable amount of time is lost and efficiency of operation is substantially reduced.

It is, therefore, a primary object of this invention to provide a garden clipper which provides the functions of several previously known devices.

It is another object of this invention to provide a garden clipper which can be employed for cutting tree branches and large bushes.

Another object of this invention is to provide a garden clipper and pruning device which reduces binding during the cutting operation.

These and other objects will be more fully realized from the novel structure of the invention which includes a hollow housing having a handle extending therefrom, a motor mounted within said housing, a pair of circular blades pivotally mounted within said housing and disposed for rotation with said motor, and a plurality of prongs extending from said housing in a predetermined relationship with said blades.

The invention, however, will be more fully realized and understood from the following detailed description when taken in conjunction with the accompanying drawing wherein:

FIGURE 1 is a top view of the invention shown partially in section;

FIGURE 2 is a side elevational view of the invention also illustrated in partial section;

FIGURE 3 is a partial detailed and enlarged view of the power take-off and blade mounting structure;

FIGURE 4 is an exploded sectional side view of the invention shown in FIGURE 2;

FIGURE 5 is a partial front view of the top portion of the motor housing;

FIGURE 6 is a sectional view taken along lines 6—6 of FIGURE 2; and

FIGURE 7 is a top view in reduced scale of the power take-off casing.

Like reference numerals throughout the various views of the drawings are intended to designate the same or similar structures therein.

With reference to the drawings in detail, there is shown therein a power take-off and blade housing 10 receivably engaging a motor housing 12. A motor 14 is disposed within housing 12 and spaced from the wall thereof by means of spacers or struts 16. A fan assembly 18 is connected to one output shaft 20 of motor 14.

Housing 12 is cylindrically shaped in the main portion thereof and the output shaft of motor 14 is coaxially aligned therein. Secured to the top of housing 12 is a wire mesh screen 22 for allowing the circulation of air to pass therethrough in the direction of the arrows shown in FIGURE 2. Screen 22 provides protection from various foreign debris which may be disposed in the air therearound. The bottom portion of housing 10 extends radially from the cylindrical portion thereof and is disposed for housing a power take-off assembly 24 and circular cutter blades 26. A base plate 28 is sealingly engaged or secured with the bottom of housing 10 and provides a bottom mount for blades 26.

Power take-off unit 24 and the mountings for blades 26 are better illustrated in FIGURE 3. As shown therein, a gear 30 is secured to a second output shaft 32 of the motor 14. A pair of bearing members 34 are secured, one in housing 10 and the other in base plate 28, for mounting of each blade assembly. In communication with each bearing member 34 is an oiler assembly 36. Disposed between the bearing members 34 is a mounting shaft 38 having a portion thereof formed in the shape of a square. Adjacent the square shaped portion is a threaded portion on the shaft for receiving a retaining nut 40. Blade 26 is disposed on the square shaped portions of shaft 38 and is retained thereon by the retaining nut. The blade assembly also includes a gear 42 mounted on shaft 38 in spaced relationship to blade 26. A chain or other suitable belt member 44 provides the driving engagement between gear 30 and gear 42 of each blade assembly.

A power take-off casing 46 includes a cover member 48 and a pan member 50. Cover member 48 is secured to motor 14 at one end thereof and is disposed for receiving shaft 42. Gears 30 and 42 and chain 44 are enclosed by the power take-off casing. A reduced scale view of the power take-off casing is illustrated in FIGURE 7. As shown therein, a hole 52 is provided through the cover member for receiving shaft 32 and a pair of holes 54 extend through both the cover member and the pan member for receiving shaft 38 therethrough. The take-off casing provides not only protection to the power take-off assembly but assists in the assembly of the device.

A facing surface 56 extends downwardly from housing 10 in adjacent relationship with one surface of blade 26 and another facing surface 58 extends upwardly from base 28 in adjacent relationship with an opposite surface of blade 26. Blade 26 extends from housing 10 through the space provided between the ends of facing surfaces 56 and 58.

A plurality of prongs extend from facing surface 56 of housing 10 and a plurality of corresponding prongs extend from facing surface 58 of base plate 28. Corresponding ones of prongs 60 and 62 are secured together by means of a screw 64 or other suitable means. The prongs are located, one on either end of housing 10 at the sides of the cutting surfaces, one in the center of housing 10 between the cutting blades, and the remaining two prongs are equally spaced between the others and in alignment with centers of the circular blades. This arrangement is better illustrated in FIGURE 1.

The prongs of the present device provide a unique function of not only gathering and guiding material toward the cutting blades, but that of providing two degrees cutting force. That is, if a branch of a tree were placed between the blade and a prong positioned at the end of housing 10 and designated by the numeral 66, the blade would tend to grip the material being cut and pull it into and upon itself. However, if the material being cut is placed adjacent the surface 68 of the prong designated with the numeral 70, the blade would tend to move the material outward and a strong force from the back of the machine would be required to cut into the material. The above conditions, of course, would be true only when the blades are rotating in the direction indicated by the arrows on FIGURE 1 and the reverse would be true if that direction of rotation is reversed.

This unique feature of the present invention allows the gardener a choice in cutting angles. This choice is particularly desired when a material to be cut is prone to binding on a cutting blade. For instance, dead wood can be quickly and easily cut without fear of binding on the cutting blade, whereas live timber which contains a considerable amount of sap, is prone to binding on a cutting blade.

Secured to the cylindrical portion of housing 10 and on an opposite side thereof from the prongs, is a handle 72 for holding and guiding the device. The handle includes a tubular member 74 and a corrugated plastic or rubber grip member 76. The wing head screw 78 is threadably engaged with tube 74 and extends therethrough to provide locking action on an extension handle 80. Wire 82 is disposed within the handle and connects the device to a source of electric current. A recessed portion 84 is provided in the extension 80 for receiving wire 82 when inserted into handle 72. The extension may be of any length as desired for a particular job and may be telescopic to provide flexibility of adjustment thereof.

Wire 82 is connected to a suitable source of current such as house current or a portable battery pack. The other end of wire 82 is connected through a switch 86 to motor 14. The lamp assembly 88 includes a light bulb 90 having a protective case including a canopy member 92 and wire mesh screen cover 94. The screen is pivoted at a point 96 and includes a clasp 98 thereon for allowing access to light bulb 90. The lamp assembly may be employed optionally during the operation by the addition of a second switch 100 mounted on a side handle 102 of the device. The lamp assembly aids the gardener when operating in darkened places and at night, as for instance, during an emergency. Handle 102 is mounted on one side of housing 10 and provides stability to the device during its operation. A corrugated plastic or rubber grip is also provided on handle 102 for insuring against slippage of the operator's hand thereon.

Base 28 extends from one end of housing 10 beneath handle 72. This extension, designated with the numeral 106, protects the operator's hand during the operation of the machine. A hole 108 is provided in extension 106 for allowing the machine to be hung on a suitable support during period of nonuse.

It can be seen from FIGURES 1, 2 and 4 that the multibladed fan assembly 18 provides circulation of air through screen 22 into the machine. Spacers 16 for supporting motor 14 in spaced relationship to the side walls of housing 12 allow free circulation of cooling air around the motor. Since plate 28 is sealingly secured to housing 10 on all sides with the exception of the facing surfaces thereon, the air passing into the machine is expelled past the blades and ends of the facing surfaces. This provides not only the function of eliminating the entrance of saw dust and other foreign matter into the machine but tends to blow saw dust, etc. from the area being cut.

The principles of the invention explained in connection with the specific exemplification thereon will suggest many other applications and modifications of the same. It is accordingly desired that, in construing the breadth of the appended claims they shall not be limited to the specific details shown and described in connection with the exemplification thereof.

What is claimed is:

A portable cutting machine comprising a pair of hollow housings one disposed within the other, a motor mounted within said one housing, a base plate secured to said other housing, a pair of cutter assemblies in spaced relationship with one another and each rotatably supported between said other housing and said base plate, each of said assemblies including a circular blade having a portion thereof extending from said other housing to provide exposed cutting surfaces, a power take-off connected between said blades and said motor, said power take-off including a plurality of gears each connected to a respective blade and to said motor, a belt member drivingly engaging said gears, said other housing including a plurality of prongs extending therefrom, some of said prongs being positioned on either side of said exposed cutting surfaces, each of a pair of the others of said prongs being disposed in alignment with the center of a respective blade and equally spaced from said prongs on the sides thereof, a lamp assembly connected to said other housing to provide light on the exposed cutting surfaces and protective means secured to said other housing and enclosing said lamp assembly, said motor including a multiblade fan assembly disposed in said one housing for cooling said motor and providing air flow from said housings past said blades for removing foreign matter therefrom, a hollow handle connected to said other housing and including means for clamping extensions thereto, ball bearing assemblies for mounting said blades and disposed in said other housing and said base plate, a pair of switches, one switch being connected to said lamp assembly and the other switch to said motor, said base plate being smooth and relatively flat and providing a substantially air tight seal with said other housing, a rearwardly extending portion from said base plate of substantially the same length as that of said handle and including a hole disposed for hanging the device on a suitable support, a stabilizing handle adapted for connection to one of the sides of said other housing, and a wire mesh screen secured to a top of said one housing in spaced relationship to said fan assembly.

References Cited by the Examiner

UNITED STATES PATENTS

| | | | |
|---|---|---|---|
| 349,105 | 9/86 | Keller | 30—276 X |
| 1,193,557 | 8/16 | Kendall | 56—295 |
| 2,532,982 | 12/50 | De Yong | 30—167 |
| 2,756,555 | 7/56 | Lewis | 30—276 X |

FOREIGN PATENTS

| | | |
|---|---|---|
| 21,387 | 5/61 | Germany. |
| 149,925 | 12/31 | Switzerland. |

WILLIAM FELDMAN, *Primary Examiner.*

MILTON S. MEHR, *Examiner.*